April 30, 1963     P. GREGER ETAL     3,087,398
CAMERA WITH EXPOSURE METER AND AUXILIARY LIGHT SOURCE
Filed June 29, 1962     2 Sheets-Sheet 1

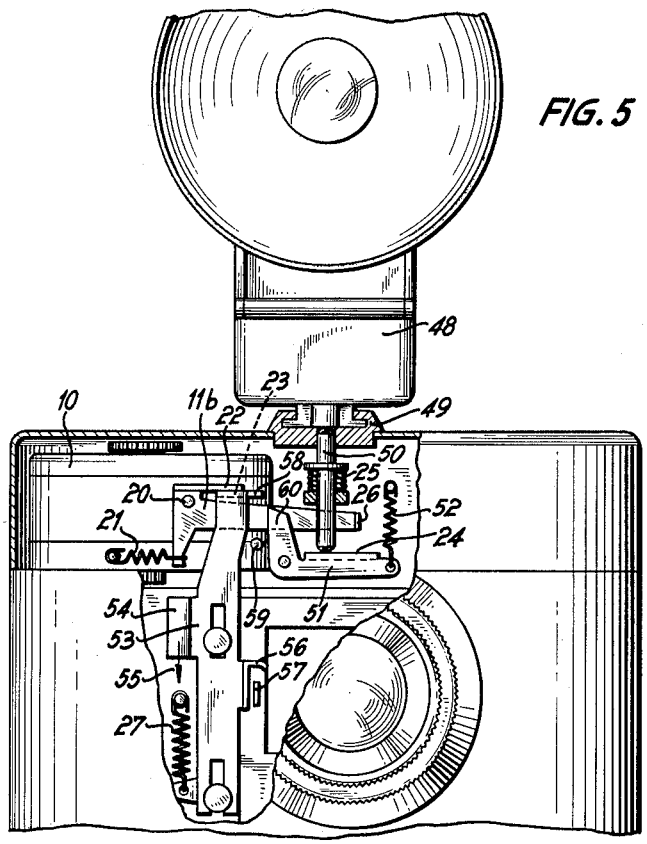

United States Patent Office 3,087,398
Patented Apr. 30, 1963

3,087,398
CAMERA WITH EXPOSURE METER AND
AUXILIARY LIGHT SOURCE
Paul Greger and Erwin Doring, Braunschweig, Germany, assignors to Voigtlander A.G., Braunschweig, Germany, a corporation of Germany
Filed June 29, 1962, Ser. No. 206,295
Claims priority, application Germany July 6, 1961
8 Claims. (Cl. 95—10)

This invention relates to photographic cameras equipped with an exposure meter and having an auxiliary light source either permanently or disengageably coupled thereto, the exposure meter having a scale of ambient illumination values divided into a first range, wherein the ambient illumination values are adequate for the possible time-diaphragm combinations of the camera, and a second and succeeding range of ambient illumination values inadequate for the possible time-diaphragm combinations of the camera, and in which the shutter release is blocked when the exposure meter indicator is within the range of inadequate ambient illumination values. More particularly, the present invention is directed to a camera of this type in which, when an auxiliary light source is in operative association with the camera, the shutter release may still be operated when the exposure meter indicator is within the range of ambient illumination values inadequate for possible time-diaphragm combinations of the camera, and with the auxiliary light source, at such time, being energized responsive to operation of the shutter release.

In known cameras of the mentioned type, no pictures can be taken when the exposure meter indicator is in the range of inadequate ambient illumination values unless special means are provided to circumvent the blocking means for the shutter release, which blocking means is effective within such range. In a pariticular known camera, the shutter release blocking device may be rendered ineffective by means of a reversing or selector device which, when moved from a "normal" position to a "flash" position, conditions the camera for operation with an auxiliary light source, including disabling of the shutter release blocking means. However, this selector or reversing device must be actuated each time the exposure meter indicator is in the range of inadequate illumination values, or else it will not be possible to release the shutter to take a picture at such time.

In accordance with the present invention, an energizing circuit, for an auxiliary light source, is provided which includes a switch device which is open when the exposure meter indicator is within the range of ambient illumination values adequate for the possible time-diaphragm combinations of the camera, and which is closed when the indicator moves into the range of ambient illumination values inadequate for the possible time-diaphragm combinations of the camera. This switch device may be closed either directly by the indicator of the exposure meter or by components associated with such indicator, such as, for example, an indicator clamping means or an indicator scanning means. Furthermore, when the indicator of the exposure meter is within the range of ambient illumination values inadequate for possible time-diaphragm combinations of the camera, the shutter release blocking device is rendered ineffective provided that the auxiliary light source is positioned in operative relation on the camera.

A particular application of the present invention is to so-called automatic cameras wherein, when the exposure meter indicator is within the range of adequate ambient illumination, the objective diaphragm is set by means of an indicator scanning device in accordance with the indication of the exposure meter, and wherein the shutter release operator is blocked in the range of inadequate ambient illumination values. In accordance with the invention, the base of the auxiliary light source, such as a flashlight device, can be engaged with a mount or shoe on the camera in such a manner that such engagement will operate means for rendering ineffective the shutter release blocking means. Preferably, the mount for the flashlight device is so designed that other accessory parts of the camera cannot be engaged therewith, so that there can be no unintentional release of the shutter release blocking means.

Moreover, the shoe or mount for the flashlight device can be designed in a standard manner wherein the base of the flashlight device is provided with pins or the like which are capable of engaging cooperating elements in the mount or shoe, and which cooperating elements are not cooperable with other accessories. Thereby, by providing a special base on the flashlight device for the purpose of actuating these cooperating elements, the shutter release blocking means would be rendered ineffective only when an auxiliary light source, such as a flashlight device, is mounted in the shoe or mount, but would remain effective if any other camera accessory were positioned in such mount.

For an understanding of the principles of the invention, reference is made to the following description of typical embodiments thereof as illustrated in the accompanying drawings. In the drawings.

FIG. 5 is a front elevational view, partly broken away and partly in section, of a camera embodying the invention and illustrating the position of certain parts associated with the shutter release and the exposure meter when an auxiliary light source, such as a flashlight device, is mounted on the camera; and FIG. 6 is a view simiar to FIG. 5 but illustrating the parts when there is no flashlight device mounted on the camera and when the exposure meter indicator is in the range of ambient light values inadequate for possible time-diaphragm combinations of the camera.

Figure 1:
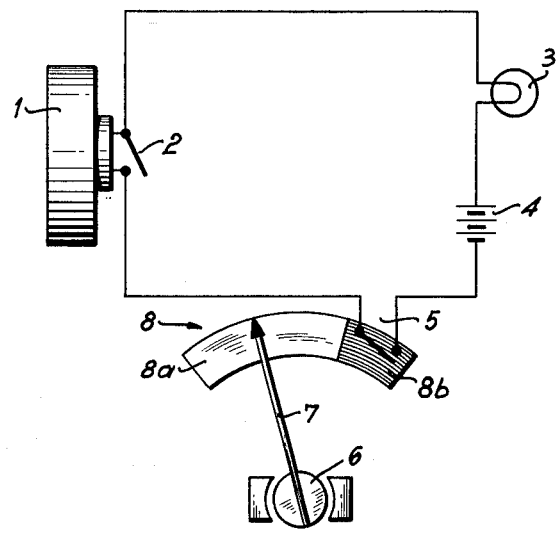
FIG. 1 is a schematic wiring diagram which is illustrative of the electrical circuitry embodied in the invention.

Referring to the wiring diagram of FIG. 1, the camera is provided with a shutter 1 which, when released, closes a normally open switch 2 which is included in the energizing circuit of an auxiliary light source 3, which may be, for example, a flashlight device although it may alternatively be an electronic auxiliary light source. A battery 4 is connected between light source 3 and one terminal of a normally open switch 5 and the other terminal of normally open switch 5 is connected to the normally open switch 2.

The camera is further provided with an exposure meter including a moving coil instrument 6 having an indicator 7 which is movable over a scale 8 indicating ambient illumination values. Scale 8 is provided into two consecutive ranges 8a and 8b. The range 8a indicates ambient light values which are adequate for the range of possible time-diaphragm combinations of the camera, while the range 8b indicates ambient light values which are inadequate for such range of possible time-diaphragm combinations of the camera. The switch device 5 is positioned within the range 8b of the scale 8 so that this switch device is closed whenever the indicator 7 moves into the range 8b. Such closure may be effected by direct engagement of the indicator with an operator of the switch device, or may be effected by elements or components associated with the indicator 7 such as, for example, a clamping member or a scanning or follow-up member. Furthermore, the switch device 5 may be incorporated directly in the energizing circuit of the auxiliary light source 3 or may be in the energizing circuit of a relay which controls energization of the light source.

Figure 2:
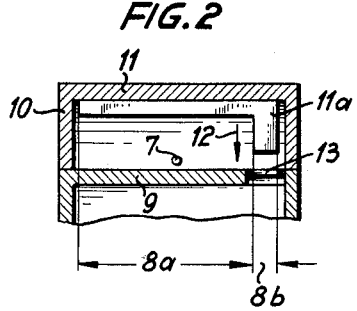
FIGS. 2, 3 and 4 are transverse sectional views through an exposure meter, incorporated in the camera, and illustrating three different positions of a clamping member for the exposure meter indicator.
Figure 3:
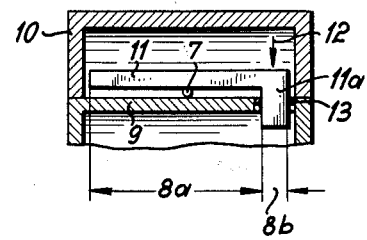
Figure 4:
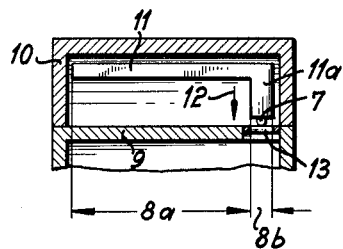

Referring to FIGS. 2, 3 and 4, when the shutter release handle or operator is depressed, the indicator 7 is clamped in its indicating position in advance of the shutter release. To this end, the exposure meter housing 10 has mounted therein a movable clamping yoke 11 which is arranged to engage the indicator 7, by movement of the yoke 11 in the direction indicated by the arrow 12, to clamp indicator 7 against the clamping surface 9. When so clamped, the position of indicator 7 can be scanned by a scanning device or a re-set device for automatic setting of the diaphragm or of the time-diaphragm combination in accordance with the reading of the exposure meter.

Yoke 11 is formed, or otherwise provided, with a lug 11a which is positioned, relative to the scale 8, through the range 8b of inadequate ambient illumination. Also, and through this range 8b, the clamping surface 9 is provided with an opening in the form of a slot 13 over which the indicator 7 extends radially. FIG. 2 illustrates the parts in the position they occupy before actuation of the shutter release operator. It will be noted that in FIGS. 2 and 3, the exposure meter indicator 7 is positioned within the range 8a, of the scale 8, this range being the range of ambient light values adequate for possible time-diaphragm combinations of the camera.

Referring particularly to FIG. 3, when indicator 7 is in the range 8a and the shutter release handle or operator is actuated, the clamping yoke 11 moves in the direction of the arrow 12 and the lug 11a passes through the breach or slot 13 so that the yoke 11 can clamp indicator 7 against the clamping surface 9. However, and as shown in FIG. 4, when indicator 7 is within the range 8b of ambient light inadequate for possible time-diaphragm combinations, movement of yoke 11 in the direction of the arrow 12 is limited by the engagement of the lug 11a with the indicator 7. Thus, in this case, the range of movement of the yoke 11 is very substantially less than it is when the indicator 7 is within the range 8a of the scale 8. The importance of this will be made apparent as the description proceeds.

FIGS. 5 and 6 illustrate the shutter release operator, and other parts of the camera, which are operatively associated with the clamping yoke 11 and the exposure meter 10. As stated, the shutter release has a blocking device which normally prevents release of the shutter when the indicator 7 is within the range 8b of the scale 8 of the exposure meter and, in accordance with the invention, means are provided whereby this blocking device is automatically made ineffective when an auxiliary light source is operatively associated with the camera.

The clamping yoke 11, shown in FIGS. 2, 3 and 4, is actuated by a lever or arm 11b which is mounted externally of the exposure meter housing 10 but which is coupled with the yoke 11. Element 11b is pivoted on housing 10 at a bearing 20, and a tension spring 21 is connected between one arm of element 11b and a fixed portion of the housing 10 so as to bias element 11b to pivot in a clockwise direction. In the position illustrated in FIG. 5, such clockwise pivoting of element 11b is limited by engagement of an angular extension 22 thereof with an angular extension 23 of a shutter release slide 53, so that the element 11b cannot move further in a clockwise direction until slide 53 is operated.

A bell crank 51 is pivoted on the camera housing and is biased, to pivot in a counterclockwise direction, by a tension spring 52 connected between one arm of the bell crank lever and a pin fixed to the housing. The spring 52, by virtue of its biasing action on the bell crank 51, tends to move the arm 60 of the bell crank beneath an extension or lug 58 of the shutter release slide 53. Bell crank 51 is formed with an angular extension 24, which has a surface engageable with a pin 50 which is mounted for vertical longitudinal displacement in the camera housing or hood. A spring 25 biases the pin 50 upwardly into the accommodation area of an anchoring shoe or mount 49 arranged to receive bases of auxiliary or accessory components, such as a flashlight device 48. Element 11b has an angular lug on the outer end of its longer arm and this lug extends into the path of movement of the bell crank 51 so that, upon clockwise pivoting of element 11b, lug 26 will engage the surface of extension 24 to pivot the bell crank 51 clockwise. Counterclockwise movement of the bell crank 51 is limited by engagement of its arm 60 with a pin 59 on the camera housing.

By means of a shutter release handle 54, the shutter release slide 53 is displaceable downwardly, as indicated by the arrow 55, in opposition to the force of a spring 27. During this downward movement of the slide 53, there is an idle period or lost motion before a lug 56 on the slide 53 engages the shutter release 57 to release the shutter. The force of the spring 27 is so selected that, in the initial position shown in FIG. 5, it not only biases the slide 53 upwardly but also biases the element 11b in a counterclockwise direction to load the spring 21.

The arrangement operates substantially as follows. With the flashlight device 48 having its base engaged in the accommodation area of the shoe 49, the pin 50 is forced downwardly against the bias of spring 25. By engagement with the surface or extension 24 of bell crank 51, pin 50 pivots the bell crank 51 clockwise against the force of spring 52 to a position wherein the arm 60 of the bell crank is out of the path of movement of the lug 58 of the slide 53. If the shutter release slide 53 is now moved downwardly, the spring 21 forces the element 11b to pivot clockwise so that angular extension 22 of element 11b is maintained in engagement with angular extension 23 of slide 53. This movement pivots the clamping yoke 11 toward the clamping surface 9, as shown in FIGS. 3 and 4, with the amount of movement of the yoke 11 being determined by whether the indicator 7 is in the range of 8a of adequate ambient illumination, as shown in FIG. 3, or in the range of inadequate illumination, as shown in FIG. 4. Correspondingly, the clockwise movement of element 11b is limited to the position of the clamping yoke 11. Thus, clamping yoke 11 will have either a relatively large or a relatively small amplitude of movement depending upon the position of the exposure meter indicator 7.

Once the yoke 11 has attained its terminal position, the element 11b no longer pivots clockwise. Thereby, upon continued downward movement of slide 53, the extension 23 of the slide disengages the extension 22 of element 11b. Upon such further downward movement of slide 53, lug 56 engages the shutter releases 57 causing the shutter to be released. In the position of the parts shown in FIG. 5, with flashlight devide 48 mounted in shoe 49, the shutter release 57 is capable of being actuated by the shutter release operator 53 at all times.

Referring to FIG. 6, it will be noted that the flashlight device 48 has been disengaged and removed from the shoe 49 of the camera. Therefore, the pin 50 is biased upwardly by spring 25 so that it extends above the surface of the shoe 49. As the pin 50 is in its upper position, the spring 52 is now able to pivot the bell crank 51 to a position in which its arm 60 engages the stop 59 and is positioned in the path of movement of the lug 58 of the shutter release slide 53. At the same time, the extension 24 or bell crank 51 engages the angular extension or lug 26 of element 11b. The spring 21 biasing the element 11b is stronger than the spring 52 biasing the bell crank 51 so that, when the spring 21 contracts, it is capable of expanding the spring 52.

If the exposure meter indicator 7 is now positioned in the range 8b of inadequate ambient illumination, when the shutter release slide 53 is moved downwardly, the extension 22 of element 11b will maintain engagement with the extension 23 of slide 53 only until such time as the exposure meter indicator 7 is locked in the range of inadequate ambient illumination by means of the yoke 11.

This position of the parts is shown in FIG. 4, and it will be noted that there is only a relatively slight movement of the yoke 11. The corresponding relatively slight movement of the element 11b will effect only very slight rotation of bell crank 51 in a clockwise direction and this slight movement of the bell crank 51 is not sufficient for the arm 60 thereof to clear the path of movement of the lug 58 of the shutter release slide 53. Consequently, the shutter release slide, when moved downwardly, will be arrested by engagement of its lug 58 with the arm 60 of the bell crank 51 to re-engage arm 60 with the stop 59. This occurs at a point before the lug 56 of slide 53 has engaged the shutter release 57. Consequently, in the range 8b of inadequate ambient illumination, the shutter release is locked.

However, if the indicator 7 is in the range 8a of adequate ambient illumination, the yoke 11 has a relatively large amplitude of movement to the position as indicated in FIG. 3. In this case, when the slide 53 is moved downwardly, the angular extension 22 of the element 11b will maintain engagement with the extension 23 of the slide 53 during a very considerable portion of the stroke of the slide. As a result, the bell crank 51 is pivoted far enough in a clockwise direction for its arm 60 to completely clear the path of movement of the lug 58 of the shutter release 53. Thus, the shutter release slide 53 can now be moved downwardly far enough for lug 56 thereof to engage the shutter release 57 to release the shutter.

With the arrangement illustrated, the shutter release is blocked when the exposure meter is within the range of inadequate ambient illumination and when there is no flashlight device mounted on the camera, but the blocking action is rendered ineffective, in the range of inadequate ambient illumination, by mounting the flashlight device 48 on the shoe 49.

In a known manner, the anchoring shoe 49 can be designed so that when the flashlight device is mounted thereon, the flashlight device is automatically cut into its energizing circuit. The portions of clamping surface 9 on either side of slot 13 can be arranged as electrical contact surfaces so as to form part of the switch device 5 of FIG. 1. Thereby, the energizing circuit for the auxiliary light source is closed when the indicator 7 is in the range of inadequate ambient illumination and bridges these surfaces, and the shutter is released, but the connected auxiliary light source is not capable of being energized when the indicator 7 is in the range 8a of adequate ambient illumination.

While specific embodiments of the invention have been shown and described in detail to illustrate the application of the principles of the invention, it will be understood that the invention may be embodied otherwise without departing from such principles.

What is claimed is:

1. A photographic camera, comprising, in combination, a mount arranged to have an auxiliary light source disengageably positioned therein; an exposure meter including an indicator movable relative to a scale having consecutive first and second ranges, the first range representing values of ambient light adequate within the range of possible time-exposure combinations of the camera, and the second range representing values of ambient light inadequate within the range of possible time-exposure combinations of the camera; a shutter; a shutter release; shutter release operating means; blocking means operable, responsive to movement of said indicator into said second range, to block operation of said shutter release operating means; and means operatively associated with said mount and said blocking means and operable, responsive to positioning of an auxiliary light source in said mount, to render said blocking means ineffective.

2. A photographic camera, as claimed in claim 1, wherein said auxiliary light source is an electric light source; an energizing circuit for said source; a normally open switch device in said circuit; means operable, responsive to movement of said indicator into said second scale range, to close said switch device; and contact means operable, responsive to positioning of said light source in said mount, to connect said light source into said energizing circuit.

3. A photographic camera, as claimed in claim 1, including a longitudinally displaceable pin normally biased to project into the accommodation area of said mount; said pin being engaged with said blocking means and, when projecting into such accommodation area, rendering said blocking means effective; said pin being displaceable inwardly, upon positioning of an auxiliary light source in said mount, to render said blocking means ineffective.

4. A photographic camera, as claimed in claim 2, including a normally open switch in said energizing circuit in series with said switch device and said contact means and closed responsive to release of said shutter.

5. A photographic camera, as claimed in claim 1, including a clamping member movable relative to said indicator and operatively associated with said shutter release operator, said clamping member clamping said indicator against a clamping surface upon operation of said shutter release operator; a lug projecting from said clamping member in the direction of movement thereof toward said indicator, said clamping surface, in the area corresponding to said second range, being apertured for passage of said lug therethrough, whereby said clamping member will have a relatively large amplitude of movement; said lug, when said indicator is within said second range, engaging said indicator to limit movement of said yoke to a relatively small amplitude of movement; said shutter release operator having an abutment projecting therefrom; said blocking means comprising an element having a portion thereof positioned in the path of movement of said abutment and effective to limit movement of said shutter release operator to a value insufficient to effect release of said shutter; means operable, responsive to movement of said clamping member through such relatively large amplitude of movement, to move said element out of the path of movement of said abutment; and means operable, responsive to a mounting of an auxiliary light source in said mount, to move said element out of the path of movement of said abutment; whereby, when no auxiliary light source is mounted in said mount, operation of said shutter release operator is blocked when said indicator is in said second range and, when an auxiliary light source is positioned in said mount, said blocking means is ineffective throughout the range of movement of said indicator.

6. A photographic camera, as claimed in claim 5, wherein said blocking means element comprises a bell crank pivotally mounted in said camera, said bell crank having a first arm movable into the path of movement of said abutment and a second arm; means biasing said bell crank to a position wherein said first arm is in the path of movement of said abutment; said means for rendering said blocking means ineffective comprising a longitudinally displaceable pin and means biasing said pin to project into the accommodation area of said mount when no auxiliary light source is positioned in said mount; said second arm of said bell crank lever being engaged by said pin upon inward movement thereof; and means operable, responsive to positioning of an auxiliary light source in said mount, to move said pin inwardly to pivot said bell crank lever to a position wherein said first arm is retracted from the path of movement of said abutment.

7. A photographic camera, as claimed in claim 6, wherein the means operable to render said blocking means ineffective during a movement of smaller amplitude of said clamping member comprises an operator connected to said clamping member for movement therewith; said operator including a projection engaged with said shutter release operating means; means biasing said operator in a direction to maintain said projection engaged with said shutter release operating means when the latter is actuated; said operator being engaged with said second arm of said bell crank lever and operable, upon movement of said clamping yoke through such relatively large amplitude of movement, to pivot said bell crank lever in a direction to withdraw the first arm thereof from the path of movement of said abutment; said operator, upon movement of said clamping member through said relatively smaller amplitude of movement, having a motion insufficient to rotate said bell crank an amount sufficient to retract said first arm of said bell crank from the path of said movement of said abutment.

8. A photographic camera, as claimed in claim 7, in which said shutter release operating means is a longitudinally movable slide; means biasing said slide in a direction to maintain an end thereof engaged with said projection on said operator; said slide having a second abutment engageable with said shutter release; said second abutment engaging said shutter release only after a movement of said slide possible only with said first arm of said bell crank lever retracted from the path of movement of said first-named abutment.

References Cited in the file of this patent

UNITED STATES PATENTS

| | | |
|---|---|---|
| 2,297,262 | Tonnies | Sept. 29, 1942 |
| 3,021,771 | Kirk | Feb. 20, 1962 |
| 3,041,949 | Buhrle | July 3, 1962 |
| 3,043,203 | Buhrle | July 10, 1962 |
| 3,051,066 | Lareau | Aug. 28, 1962 |